United States Patent [19]

Matsuoka

[11] Patent Number: 5,005,097
[45] Date of Patent: Apr. 2, 1991

[54] MAGNETIC HEAD WITH A COIL AND CORE SUPPORTING BOBBIN

[75] Inventor: Seigou Matsuoka, Arao, Japan
[73] Assignee: Matsushita Electric Industrial Co., Ltd., Kadoma, Japan
[21] Appl. No.: 293,776
[22] Filed: Jan. 4, 1989
[51] Int. Cl.$^5$ .......................... G11B 5/265; G11B 5/17
[52] U.S. Cl. .................... 360/121; 360/123; 360/125
[58] Field of Search ................. 360/121, 123, 125, 103

[56] References Cited
U.S. PATENT DOCUMENTS
4,118,747 10/1978 Hanaoka et al. ..................... 360/121
4,809,112 2/1989 Noguchi et al. ..................... 360/121

FOREIGN PATENT DOCUMENTS
61-150110 7/1986 Japan ................................. 360/123

Primary Examiner—Robert S. Tupper
Attorney, Agent, or Firm—Cushman, Darby & Cushman

[57] ABSTRACT

In a magnetic head, a bobbin is wound with coils for reading and writing and for erasing. A front core having a core for reading and writing and a core for erasing, a back core and a dummy core are supported by the bobbin by passing through respective aperture in the bobbin. The front core is connected to the back core to generate a magnetic flux with the coils.

2 Claims, 5 Drawing Sheets

MAGNETIC HEAD WITH A COIL AND CORE SUPPORTING BOBBIN

FIELD OF THE INVENTION AND RELATED ART STATEMENT

1. Field of the Invention

The present invention relates to a magnetic head for a magnetic disk driving apparatus.

2. Description of the Related Art

A conventional magnetic head for a magnetic disk driving apparatus constitutes a front core consisting of a core having a gap for writing and reading and another core having a gap for tunnel erasing in an integral body, a frame-like for supporting the front core, and gimbals or the like for mounting the slider.

Hereinafter, the above-mentioned conventional magnetic head which is shown in Japanese unexamined published applications Sho Nos. 60-57518, Sho 60-197912 or Sho 61-57018, is described with reference to the accompanying figures FIG. 5 and FIG. 6. A front core 25 is supported between sliders 26 and 27. Both sliders 26 and 27 are mounted on gimbals 28. A writing and reading coil 29 is wound around a coil bobbin 30. A channel-shaped leaf spring 32 clips a back end of the front core 25 and a back core 31 together.

The above-mentioned magnetic head suffers from the following disadvantages. The production of the sliders 26 and 27 is very difficult due to their complex shape. The smallness of the areas for bonding the front core 25 to each of the sliders 26 and 27 results in reduced adhesive strength. In the above-mentioned constitution, before the writing end reading coil 29 nad the erasing coil erasing (not shown in Figures) can be assembled, they must be wound around the coil bobbin 30 made of synthetic resin. Subsequently, the coil bobbin 30 with coils is fitted to the stick shaped front core 25. The coil bobbin 30 is necessary to hold the wires of the coils, and thus, the necessity of parts such as the sliders and coil bobbin increase number of necessary parts.

OBJECT AND SUMMARY OF THE INVENTION

The present invention is made in view of the above-mentioned disadvantages in the related art. The object of the present invention is to provide a magnetic head having many advantages such as a small number of parts, time-saving workability and high mechanical strength with simple construction.

A magnetic head in accordance with the present invention comprises:
- a front core having a media-touching portion and protrusion at at least one portion;
- a back core with which the front core is connected to produce a magnetic path; and
- a bobbin for holding thereon at least one coil for generating magnetic flux on the magnetic path, the bobbin having at least one hole to which the protrusion of the front core is inserted to support the front core by the bobbin.

The bobbin is mounted on the gimbals or the like, thus fixing both the front core and the back core on the gimbals by the bobbin. Specifically the bobbin becomes a supporter to support the above-mentioned front core and frame-like back core. Furthermore, the bobbin supports both the writing and reading and the erasing coils. Therefore, the above-mentioned purposes of the invention are achieved.

While the novel features of the invention are set forth particularly in the appended claims, the invention, both as to origanization and content, will be better understood and appreciated, along with other objects and features thereof, form the fololowing detailed description taken in conjunction with the drawings.

Figure 1:
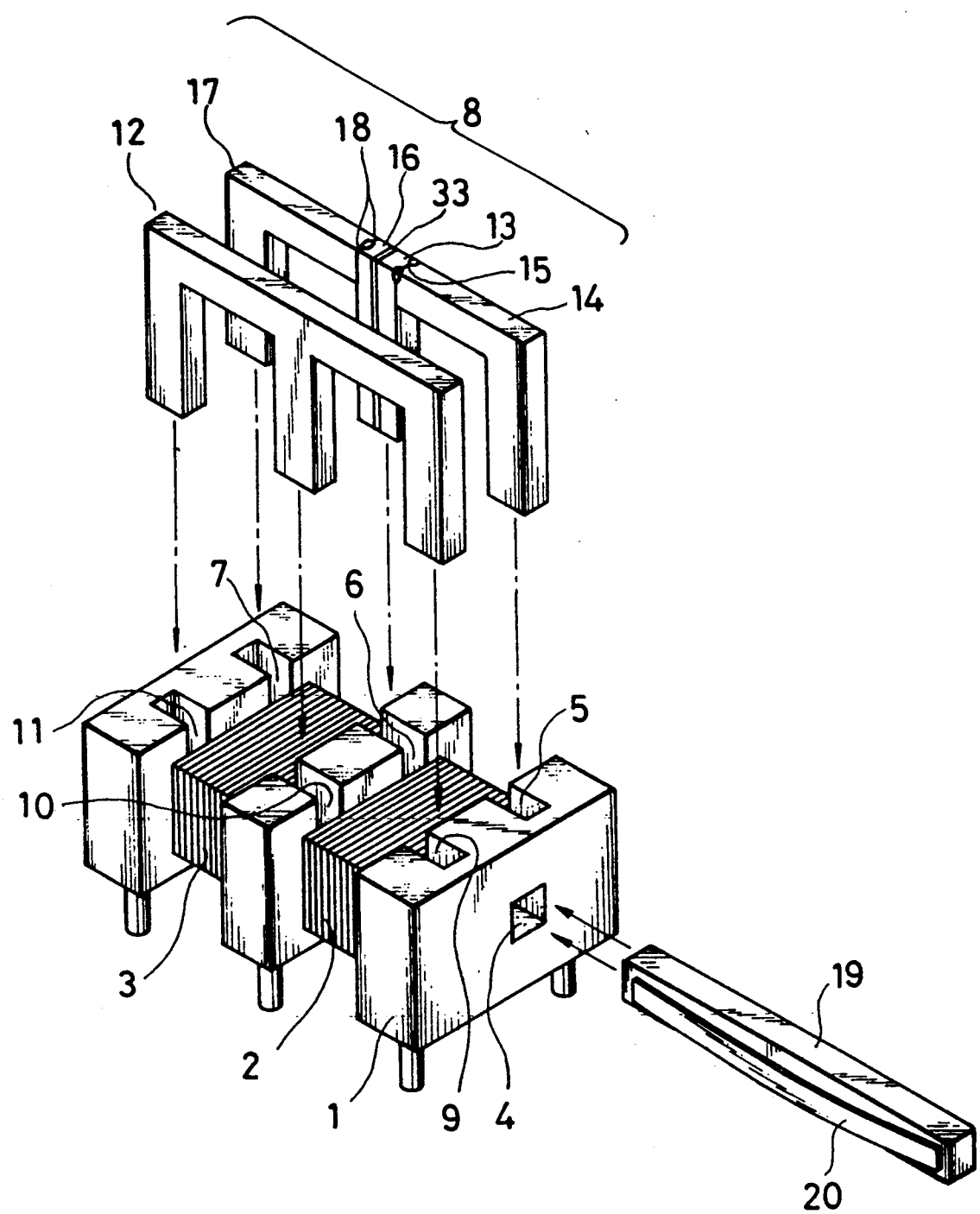
FIG. 1 is an exploded view in perspective of a magnetic head of this invention illustrating the internal parts of a magnetic head as they appear during assembly thereof.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereinafter the present invention is described in detail with reference to FIGS. 1–4 whereby the preferred embodiment is shown.

A body 1 is used both as a coil bobbin and a frame for supporting a front core 8. Usually, the body 1 is made of a synthetic resin. A writing and reading coil 2 is wound around a portion of the body 1. An erasing coil 3 is wound around another portion of the body 1. A through-aperture 4 penetrates the body 1 at almost the center thereof.

Portions of a front core 8 are inserted into through-apertures 5, 6 and 7. Respective through-apertures 5 and 7 penetrate each end of the body 1, and the through-apertures 6 penetrates the partition part of the body 1 between the writing and reading coil 2 and the erasing coil 3. All through-apertures 5, 6 and 7 penetrate from one side to another side of the body 1 (not be shown in FIG. 1). Through-apertures 4 crosses respective through-apertures 5, 6 and 7. Legs 121, 122, 123 of a dummy core 12 are inserted into through-apertures 9, 10 and 11. Through-apertures 9, 10 and 11 are similar to through-apertures 5, 6 and 7, except that the former do not cross the through-aperture 4. Specifically, the through-aperture 4 is displaced from the center of the body 1 toward through-apertures 5, 6 and 7 to cross through-apertures 5, 6 and 7.

A writing and reading I type core 13 is bonded to a writing and reading L type core 14 with glass bonding. A writing and reading gap 15 is formed at the bonding part. An erasing I type core 16 is similarly bonded to an erasing L type core 17 with glass bonding. Erasing gaps 18 are formed at the bonding part. Further, the writing and reading I type core 13 is bonded to the erasing I type core 16 by sandwiching a spacer 33 therebetween in order to assemble the front core 8 in a body. The dummy core 12 is shaped similarly to the front core 8. The hardness of the surface of the dummy core 12 should be kept substantially the same as the front core 8, so as to equalize the amount of wear of each core 8 and 12. For example, of the front core 8 is made of ferrite, the dummy core 12 will be made of ceramic.

Figure 3:
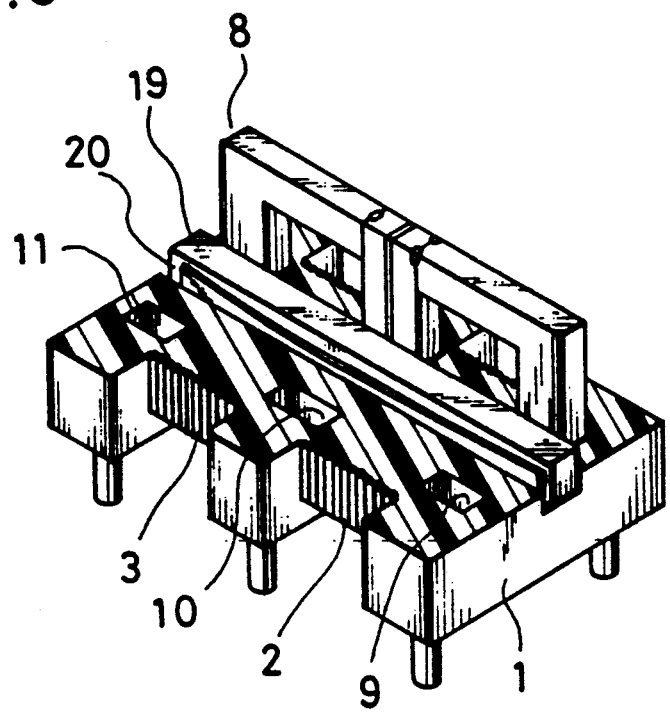
FIG. 3 is a partially cutaway view in perspective of the magnetic head taken from FIG. 2.

After winding the writing and reading coil 2 and erasing coil 3, the front core 8 and the dummy core 12 are inserted into the body 1 as shown in FIG. 1 and then are bonded by a synthetic resin adhesive. A back core 19 and an arc shaped leaf spring 20 are inserted into the through-aperture 4. The back core 19 is pushed toward the front core 8 by reaction of the leaf spring 20 in the through-aperture 4 as shown in FIG. 3. Thereby, a preferable magnetic contact is obtained. Specifically, respective magnetic paths having gaps 15 and 18 are formed. The back core 19 is also bonded to the body 1 by synthetic resin adhesive. When the magnetic head operates, the coils 2, and 3 generate magnetic flux on the magnetic path.

Figure 2:
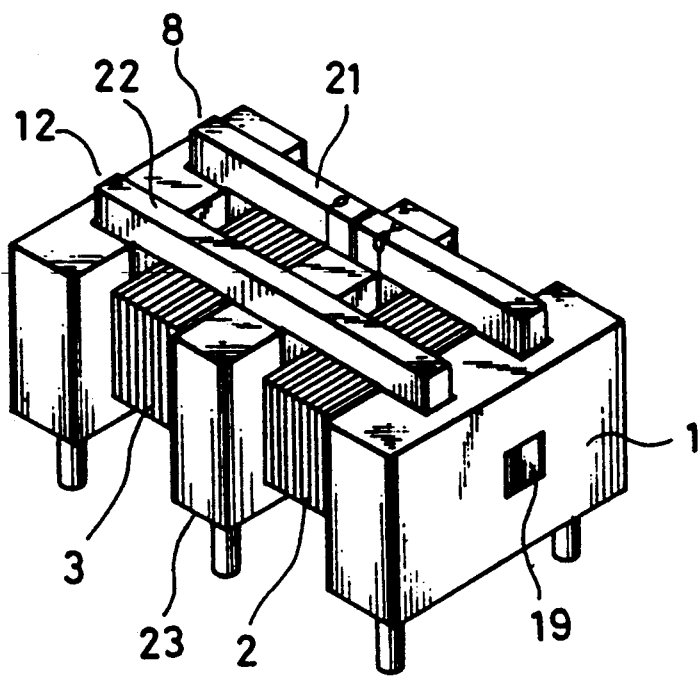
FIG. 2 is a perspective view of the magnetic head taken from FIG. 1.
Figure 4:
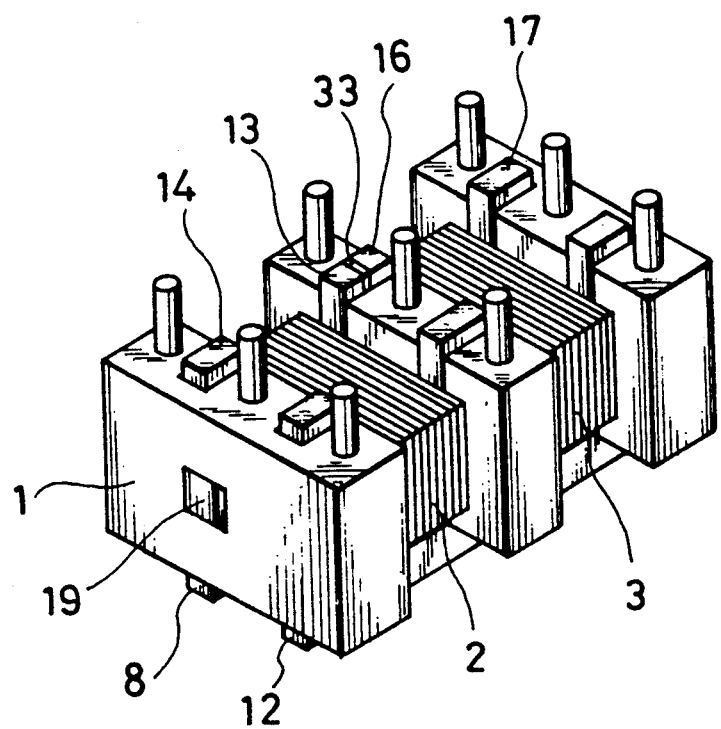
FIG. 4 is a perspective bottom of the magnetic head taken from FIG. 2.
Figure 5:
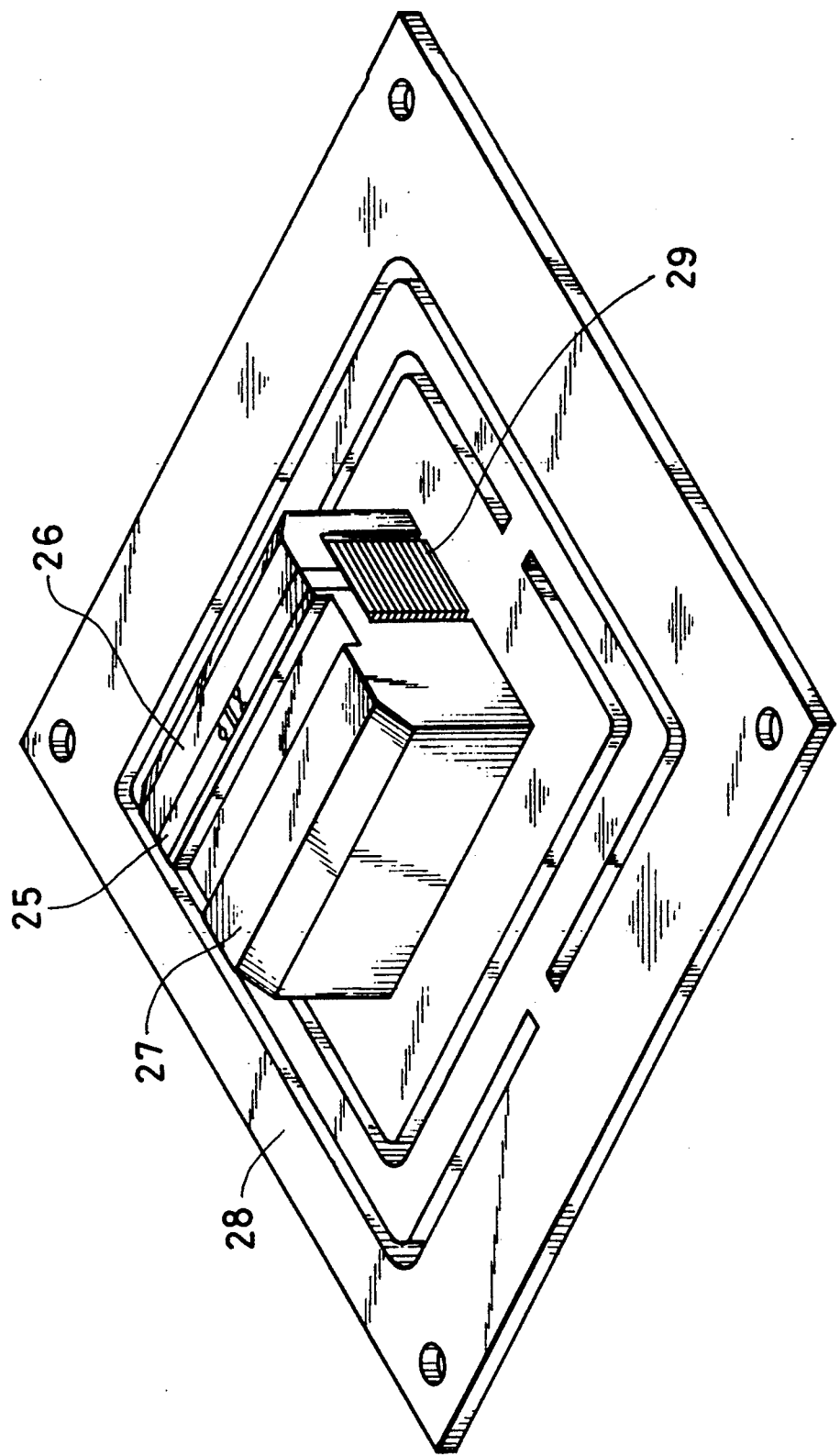
FIG. 5 is a perspective view of a magnetic head of the prior art.
Figure 6:
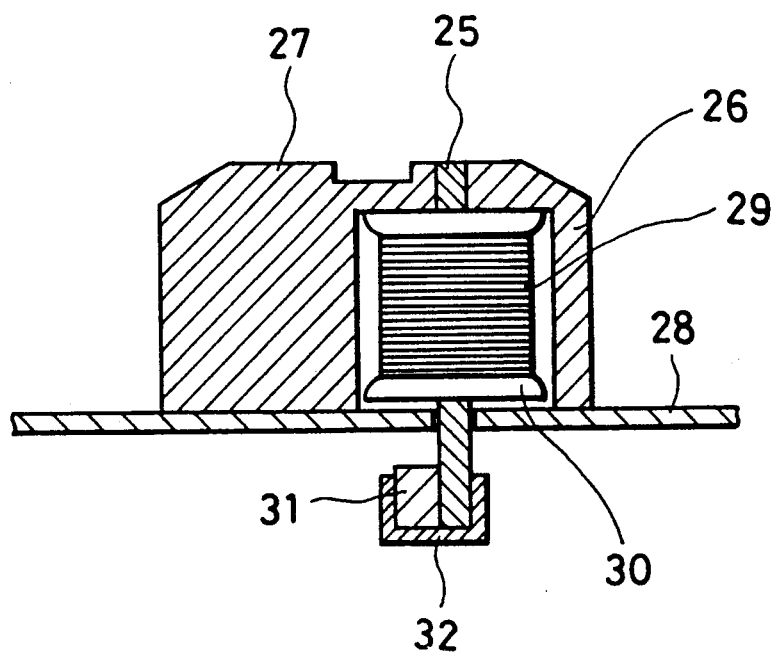
FIG. 6 is a side elevation view partly in cross section of the magnetic head taken from FIG. 5.

FIGS. 2 and 4 show the magnetic head after assembly of the front core 8, the dummy core 12 and the back core 19. The coils 2 and 3 are covered with silicon rubber or the like for mechanical and chemical protection. Both media-sliding surfaces 21 and 22 of the front core 8 and the dummy core 12 protrude from the body 1 at the same height. Then both media-sliding surfaces 21 and 22 are ground to adjust the height from the bottom surface 23 of the body 1 to a desired value.

Although the invention has been described in its preferred form with a certain degree of particularity, it is understood that the present disclosure of the preferred form can be changed in the details of construction and the combination and arrangement of parts without departing from the spirit and the scope of the invention as hereinafter claimed.

What is claimed is:

1. A magnetic head comprising:
   at least one coil;
   a front core having a media-touching portion and at least one protrusion;
   a back core;
   a dummy core disposed parallel to said front core; and
   a bobbin for holding thereon said at least one coil for generating magnetic flux,
   said bobbin having at least two apertures through which said dummy core and said protrusion of said front core are respectively disposed to effect an integral assembly of said front core, said dummy core and said bobbin,
   said back core extending in said bobbin and through said at least one coil and being in contact with said at least one protrusion of said front core to produce therewith at least one magnetic path for said magnetic flux.

2. A magnetic head comprising:
   at least two coils including at least one writing and reading coil and at least one erasing coil;
   a front core having a media-touching portion, at least one protrusion, a writing and reading core, and an erasing core;
   a back core;
   a dummy core disposed parallel to said front core; and
   a bobbin for holding thereon said at least two coils,
   said bobbin having at least three apertures through which said back core, dummy core and said at least one protrusion of said front core are respectively disposed to effect an integral assembly of said front core, said dummy core and said bobbin,
   said back core extending through said at least two coils and being in contact with said at least one protrusion of said front core.

* * * * *